United States Patent Office 3,507,672
Patented Apr. 21, 1970

3,507,672
PREPARATION OF HIGH-STRENGTH
LIME-SAND PRODUCTS
Josef Wuhrer, Günter Radermacher, and Adrian Ottenheym, Wulfrath, Germany, assignors to Rheinische Kalksteinwerke G.m.b.H., Wulfrath, Germany, a corporation of Germany
Filed July 8, 1966, Ser. No. 563,854
Claims priority, application Germany, July 9, 1965, R 41,054; Aug. 24, 1965, R 41,380
Int. Cl. C04b 1/00, 7/34
U.S. Cl. 106—120                    8 Claims

ABSTRACT OF THE DISCLOSURE

A process for the manufacture of high-strength lime-sand building materials includes the use of quartz having particle sizes within the limits of between $5\mu$ and 1 mm., wherein the ratio of lime to quartz is between 12 and 35 percent of the quartz by weight and the compacted mass is heated by saturated steam at a rate to bring the temperature of the mass to 120° C. in a period of time no less than 45 minutes.

---

This invention relates to a process for the manufacture of high-strength lime-sand building materials such as blocks, bricks, pipes, and similar articles.

Molded articles made from lime and sand, to which cement may be added, are known. Various procedures have been proposed which allowed of obtaining a strength of at most 2000 kg./cm.$^2$. For instance, DAS 1,172,594 discloses a method where finely powdered quartz is intimately mixed with hydrated lime in a mole ratio of 1:1 corresponding to a weight ratio of about 45:55; up to 65 percent of additional materials may be added, and the mixture, with addition of a predetermined amount of water, is formed to the desired shape, compacted by vibrating, tamping, or the like, and finally steam-cured. Such shaped bodies are alleged to reach a compressive strength up to 1200 kg./cm.$^2$.

The British specification No. 943,018 discloses a method where the quartz sand is subjected to impacts in a so-called disintegrator. Use of thus treated quartz sand is said to produce sand-lime bricks having a strength up to 2000 kg./cm.$^2$.

All said known methods are based on modifications of individual treatment steps, e.g., treatment of the starting material, specific methods of mixing, adjusting the proportion of lime in the mixture, improvements in the compression or curing steps. However, it has not been possible in this way to increase the strength beyond the 2000 kg./cm.$^2$ limit.

We have found that considerably higher strengths, up to 3000 kg./cm.$^2$ and more, can be obtained by using quartz having a particle size between well defined limits, by adjusting the amounts of calcium oxide or hydroxide, and by maintaining a certain rate of heating in the hydrothermal curing step.

Figure 1:
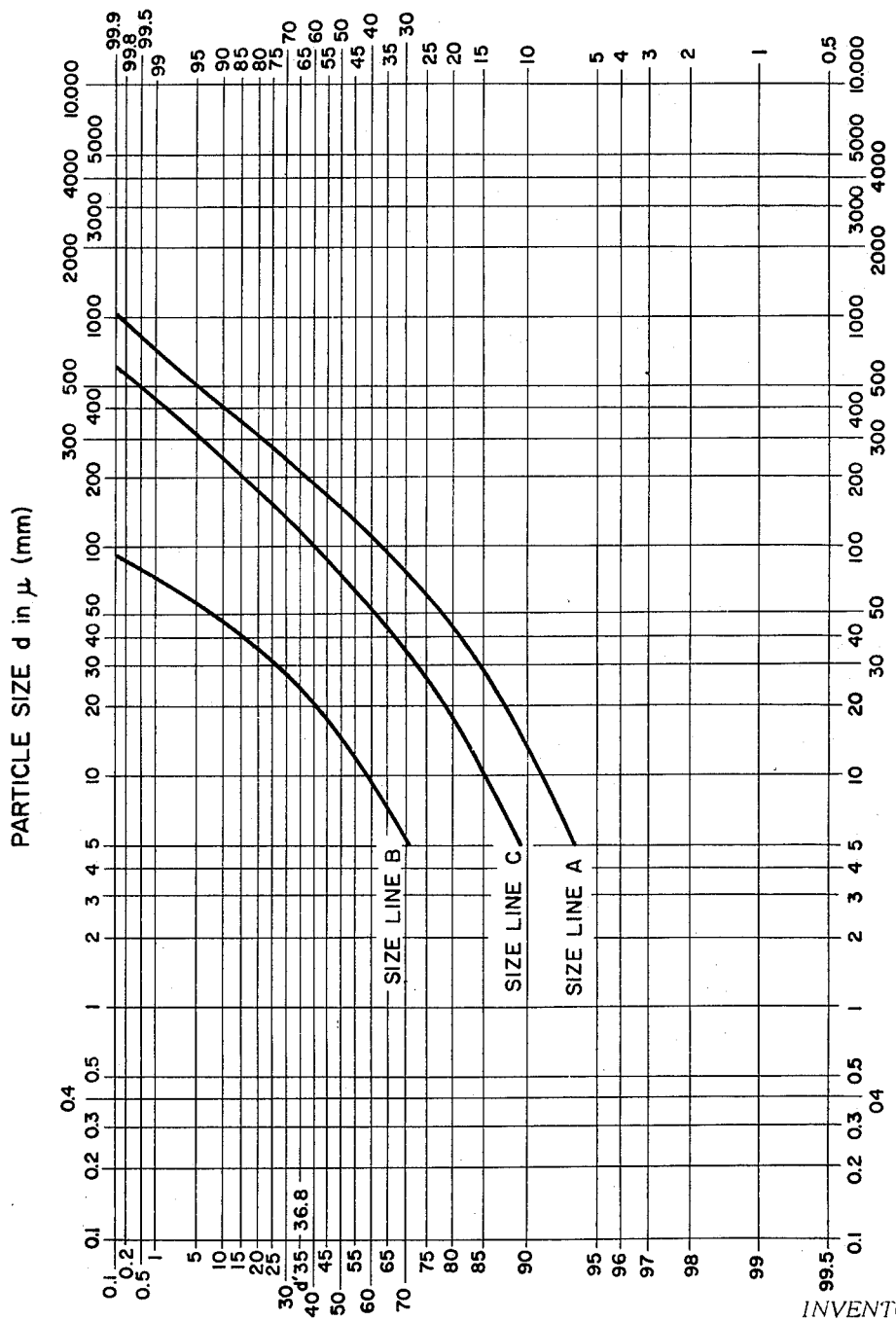
Figure 2:
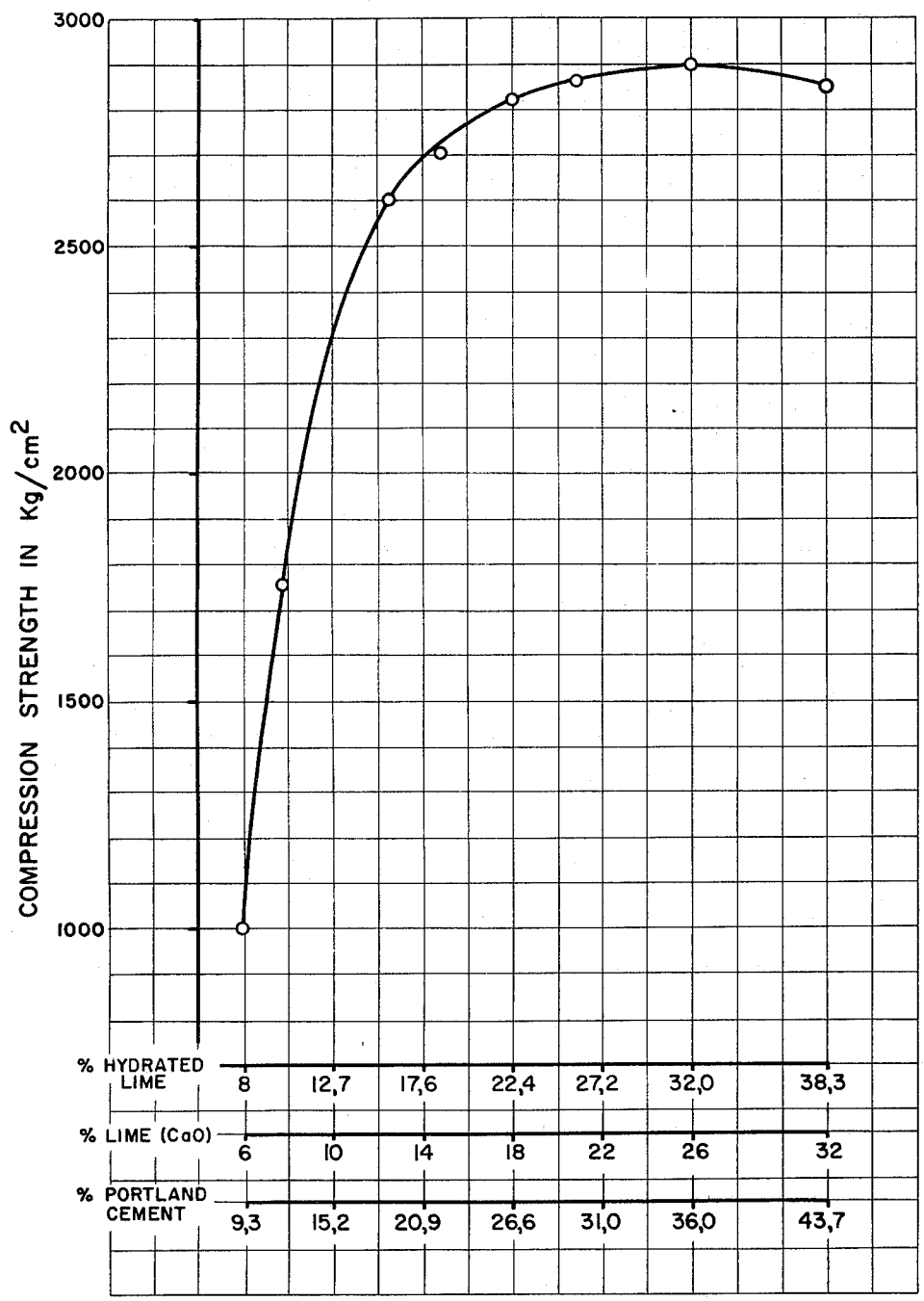

The invention will be described more in detail with reference to the accompanying drawings, wherein FIG. 1 is a graph showing the grain size of the quartz and the added aggregates, and FIG. 2 is a graph illustrating the compressive strength of the obtained products as a function of the calcium oxide or calcium hydroxide content.

The invention is based on a combination of the following features:

(a) The grain band of the finely powdered quartz sand in the range of 5 to $90\mu$ lies within the grain lines A and B of FIG. 1.

(b) The amount of calcium oxide (or the equivalent amount of calcium hydroxide), calculated on the finely powdered quartz sand, is at least 12, preferably 16 to 35 percent by weight.

(c) In the hydrothermal treatment step, at least 45 minutes must be allowed to reach the temperature of 120° C.

The limitation as to the amount of calcium oxide means that e.g. at 12% CaO, 88% by weight of quartz sand, and for 16% CaO, 84% of quartz sand must be used. This does not exclude the presence of other materials, which however, are ignored for the calculation of the calcium oxide content.

On the other hand, the calcium oxide or hydroxide can be replaced, wholly or in part, by a CaO containing binder such as Portland cement. The respective equivalent figures are given at the bottom of FIG. 2; generally, the equivalent amount of a cement is about 1.5 times the amount of calcium oxide.

At least about 10, preferably 13 to 20 percent of the CaO should have a grain size corresponding to the grain band $5\mu$ to 1 mm.

When commercial types of burnt or slaked lime are used, the impurities have to be taken into account when calculating the required amounts of CaO.

High strength additives of suitable grain size may be employed. Such additive materials will be designated hereinafter aggregates. Suitable aggregates are gravel, basalt, olivine, limestone, and others. Of course, if excessive amounts of such aggregates are added, the strength of the finished products will be reduced. At least part of the aggregates should have a grain size between $90\mu$ and 1 mm. Thereby, the grain size of the quartz sand and the aggregates should be so adjusted as to have the grain band of both between $5\mu$ and 1 mm. within the grain lines A and B of FIG. 1.

Instead of, or in addition to, such aggregates, mineral fibers such as asbestos or rock wool, or heat resistant synthetic fibers, or also metal fibers may be incorporated; such fibers increase the relation of tensional to compressional strength. An amount of 10% by weight of asbestos fibers, for instance, has been found to be useful in the manufacture of pipes according to the process of the invention.

The strength of the finished articles is independent of the manner of comminution of the components. Therefore, the grain band required according to the invention for the quartz sand can be composed of quartz as naturally found, ground quartz, and/or impact treated quartz, and our method is independent of any specific disintegrating methods or devices.

As shown in FIG. 1, the grain size of the powdery quartz between $5\mu$ and $90\mu$ on the one hand, and that of the aggregate between $90\mu$ and 1 mm. on the other hand, should be so adjusted as to fall within the grain lines A and B of FIG. 1.

On the horizontal axis, there are plotted the screen openings from 0.1 to $10,000\mu$; on the right vertical axis, there is plotted the percentage of material by weight that passes through the particular screen openings, and on the left vertical axis is plotted the percentage of material held on the screen (the residue). The left and right figures for the same ordinate, must, of course, add up to 100. When a screen is used which allows passage of the grain size $x$, then $y$ percent of the grain size "$x$ and smaller" will constitute the passage. The graph defines that when using a $90\mu$ screen, 34% to 99.9% of the material must pass. For a screen allowing passage of $20\mu$ grains, the percentage of said passage must be between 60 and 12, and for a $5\mu$ screen between 30 and 6%. The following table gives, from FIG. 1, the respective figures of the residue for screens for passage of grains from 5μ to 1 mm. Curve C is taken as an example for a grain size curve within the range defined by the limiting curves A and B.

TABLE

| Grain size, μ | B | C | A |
|---|---|---|---|
| 5 | 70.5 | 89.5 | 93.8 |
| 10 | 59.5 | 85.5 | 91.7 |
| 20 | 40.2 | 78.8 | 88.1 |
| 30 | 26.1 | 72.4 | 84.9 |
| 40 | 15.7 | 66.6 | 81.8 |
| 60 | 4.0 | 56.0 | 75.3 |
| 90 | 0.0 | 43.0 | 66.1 |
| 200 | | 14.5 | 37.4 |
| 315 | | 4.0 | 18.1 |
| 600 | | 0.4 | 5.2 |
| 530 | | 0.0 | 2.0 |
| 1,000 | | | 0.0 |

FIG. 2 shows the compressive strength in kg./cm.² of bricks made with quartz of a grain size corresponding to line C of FIG. 1. It will be seen that the obtainable strengths decrease strongly below 10% by weight of calcium oxide, and that calcium oxide contends of more than 20 percent by weight do not produce any further strength increase.

The starting materials are kneaded in the presence of sufficient water; the free water content should be about 6 to 10, preferably 7 to 9 percent by weight, e.g. in a forced circulation or edge runner mixer. Prolonged kneading times up to 20 minutes allowed of increasing the strength, after the steam curing, by almost 20 percent. Still longer kneading times do not give any further substantial strength increase.

In calculating the amount of "free" water added, the figures given hereinabove do not take into account any water required for slacrking quick lime. Said water is, of course, additional.

In the manufacture of articles of larger dimensions, such as slabs and tiles for footwalks, pipes, and the like, it is of advantage to compact the shapes not in presses but by vibrating or tamping, so as to prevent formation of layers and to ensure a homogeneous structure over the entire thickness of the article. In the production of such articles in accordance with our process, we have found that it is of great advantage to operate with an excess of water and to remove said excess during compacting, e.g. by means of porous absorbent inserts, screens, channels, and drains placed in the mold. For this type of articles, more than 10 percent by weight of water, preferably more than 15 percent, should be added, and the amount exceeding e.g. 9–10 percent should be removed in the shaping and compacting step.

When e.g. quartz sand of the grain line C (FIG. 1) is used for the centrifugal casting of pipes, the mixture may contain 45 to 50 percent by weight of free water to produce a pumpable slurry. With higher contents of coarse grains, the mass becomes pumpable already at a free water content of 35 percent and less.

In carrying out the addition of water, it is of advantage to mix the mass first vigorously with a little water and then add the water excess with further kneading. The amount of excess water depends to a certain extent on the proportion of finely ground quartz sand. If said proportion is higher, more water is required than for lower proportions of fine grains.

After kneading, the masses are formed and compacted by conventional procedures; strong compacting may produce a further increase of the compressive strength. It is of advantage to carry out the compacting step in such a way that the cured shaped bodies have a raw density of at least 1.8.

Finally, the shaped or molded articles are cured by a hydrothermal treatment; (autoclaving) generally with saturated steam in a closed vessel. According to the invention, during the heating-up period for said hydrothermal treatment, the time to reach a temperature of 120° C. must be at least 45 minutes, whereby the temperature increase within said period should be uniform. The final heating up for the hydrothermal treatment proper, up to temperatures of at least 160° C., and the length of the hardening step are those conventionally used. The slow uniform heating-up step can be carried out e.g. in a preheating chamber, by using the waste steam of the curing vessels (autoclave).

The following example is given to illustrate a preferred embodiment of the invention.

EXAMPLE 8 parts by weight of quartz sand defined by the grain line C of FIG. 1 are intimately mixed with 2 parts by weight of lime (95% CaO) and 0.7 part of water. Thereby, the lime is hydrated. The dry mixture is then thoroughly mixed with 0.80 part of water in a pug mill. Subsequently further 1.7 parts by weight of water are mixed in. The thus obtained free water containing mass is subjected in a mold vibration and to pressure which is gradually increased to 350 kg./cm.². Thereby, the excess water is removed by drainage. Then, the shaped body is slowly heated within 60 minutes to a temperature of 120° C. and then hydrothermally cured at a temperature of 170° C. in conventional manner; it has a raw density of 2.1 g./cm.³ and a compressive strength of 3500 kg./cm.².

We claim:
1. A process for the production of high-strength lime-sand shaped bodies comprising mixing quartz sand having a grain size line which lies substantially in the range of 5 to 90μ between the grain size lines A and B of FIG. 1 with 12 to 35 percent by weight of lime, calculated as CaO on the weight of said quartz sand, compacting said mixture, heating the compacted mass in saturated steam within a time of at least 45 minutes to 120° C., and then curing the shaped bodies at a temperature of at least 160° C.

2. The process as claimed in claim 1 comprising incorporating in the mixture a quartz containing aggregate having a grain size line in the range of 90μ to 1 mm. between the grain size lines A and B of FIG. 1.

3. The process as claimed in claim 2 wherein the amount of lime, calculated as CaO, is 13 to 20 percent by weight of the quartz sand and aggregate.

4. The process as claimed in claim 1 comprising compacting the mass so that the cured shaped bodies have a raw density of at least 1.8 g./cm.³.

5. The process as claimed in claim 1 wherein the mixture subjected to the compacting step has a water content of about 6 to 10 percent by weight of the dry mixture.

6. The process as claimed in claim 5 comprising compacting the mixture in presence of more than 10 percent of free water and removing the excess over 6 to 10 percent during compacting.

7. The process as claimed in claim 6 wherein the mass is compacted by vibration.

8. The process as claimed in claim 6 wherein the mass is compacted by centrifuging.

References Cited

FOREIGN PATENTS 537,525   2/1957   Canada.
593,648   10/1947  Great Britain.

JAMES E. POER, Primary Examiner